(12) United States Patent
Elliott (10) Patent No.: US 7,035,390 B2
(45) Date of Patent: Apr. 25, 2006

(54) USER CONTROLLED CALL ROUTING FOR MULTIPLE TELEPHONY DEVICES

(75) Inventor: Stephen Bennett Elliott, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 225 days.

(21) Appl. No.: 10/384,047

(22) Filed: Mar. 7, 2003

(65) Prior Publication Data

US 2004/0174976 A1    Sep. 9, 2004

(51) Int. Cl.
*H04M 3/42* (2006.01)
(52) U.S. Cl. .......................... 379/201.02; 379/201.03; 379/207.02
(58) Field of Classification Search ........ 370/352–356; 379/88.18–88.19, 88.2, 88.21, 88.26, 201.02, 379/201.03, 207.12, 207.15, 210.02, 211.01, 379/211.02, 211.03
See application file for complete search history.

(56) References Cited

U.S. PATENT DOCUMENTS

| | | | | |
|---|---|---|---|---|
| 4,313,035 | A * | 1/1982 | Jordan et al. .......... | 379/211.02 |
| 5,206,901 | A * | 4/1993 | Harlow et al. ......... | 379/211.04 |
| 5,243,645 | A * | 9/1993 | Bissell et al. .......... | 379/211.02 |
| 5,329,578 | A * | 7/1994 | Brennan et al. ....... | 379/211.03 |
| 5,550,907 | A * | 8/1996 | Carlsen ................ | 379/211.02 |
| 5,724,411 | A * | 3/1998 | Eisdorfer et al. ....... | 379/93.23 |
| 5,793,859 | A * | 8/1998 | Matthews ............. | 379/211.03 |
| 5,802,160 | A * | 9/1998 | Kugell et al. .......... | 379/211.04 |
| 5,805,587 | A * | 9/1998 | Norris et al. .......... | 370/352 |
| 5,896,448 | A | 4/1999 | Holt ..................... | 379/211 |
| 5,905,789 | A * | 5/1999 | Will ..................... | 379/211.03 |
| 5,946,386 | A | 8/1999 | Rogers et al. ......... | 379/265 |
| 5,978,673 | A | 11/1999 | Alperovich et al. .... | 455/417 |
| 5,999,611 | A * | 12/1999 | Tatchell et al. ........ | 379/211.02 |
| 6,011,843 | A | 1/2000 | Hochman et al. ...... | 379/211 |
| 6,094,478 | A | 7/2000 | Shepherd et al. ....... | 379/211 |
| 6,104,799 | A * | 8/2000 | Jain et al. ............. | 379/211.01 |
| 6,125,176 | A * | 9/2000 | Foladare et al. ....... | 379/211.02 |
| 6,130,938 | A * | 10/2000 | Erb ...................... | 379/211.02 |
| 6,141,556 | A | 10/2000 | Dougherty et al. ..... | 455/445 |
| 6,144,644 | A * | 11/2000 | Bajzath et al. ......... | 370/259 |
| 6,208,854 | B1 | 3/2001 | Roberts et al. ......... | 455/417 |
| 6,301,350 | B1 | 10/2001 | Henningson et al. .. | 379/220.01 |

(Continued)

FOREIGN PATENT DOCUMENTS

EP    0484067    5/1992

(Continued)

OTHER PUBLICATIONS

International Search Report for PCT/IB2004/000619 mailed on Sep. 1, 2004.

*Primary Examiner*—Bing Q. Bui
(74) *Attorney, Agent, or Firm*—Withrow & Terranova, PLLC (57) ABSTRACT

The present invention provides a service node capable of coordinating call processing for incoming calls intended for any one of multiple telephony devices of a given entity, such as a business or individual user. Switching devices, such as traditional telephony switches or internetworked gateways controlling call routing, are configured to interact with the service node to determine how to handle incoming calls to the telephony devices that they serve. Through a variety of techniques, the entity can dynamically instruct the service node how to route incoming calls, and preferably, upon putting those instructions into effect, the service node will send an alert to the entity. The instructions are used by the service node to create call processing rules for the switching devices to apply to an incoming call intended for any of the entity's telephony devices.

44 Claims, 5 Drawing Sheets

U.S. PATENT DOCUMENTS

| | | | |
|---|---|---|---|
| 6,330,322 B1 * | 12/2001 | Foladare et al. | 379/211.01 |
| 6,366,661 B1 * | 4/2002 | Devillier et al. | 379/211.01 |
| 6,377,668 B1 * | 4/2002 | Smock et al. | 379/142.08 |
| 6,678,366 B1 | 1/2004 | Burger et al. | 379/211.03 |

FOREIGN PATENT DOCUMENTS

| | | |
|---|---|---|
| EP | 1 043 902 A2 | 10/2000 |
| WO | WO 98/35514 | 8/1998 |
| WO | WO 00/41542 | 7/2000 |

* cited by examiner

USER CONTROLLED CALL ROUTING FOR MULTIPLE TELEPHONY DEVICES

FIELD OF THE INVENTION

The present invention relates to call processing, and in particular to allowing a user to control call routing for multiple telephony devices associated with the given user.

BACKGROUND OF THE INVENTION

Telephony users today have multiple communication devices with which to stay in touch with the world. Managing these various communication devices in a consistent and efficient manner is increasingly challenging. Callers trying to contact a user often do not know which directory number should be used to reach the user, and will often have to make multiple call attempts, and in the process, leave multiple voicemails in different voicemail systems of the user. Attempts to minimize these complications have led to "one number" services, where a user can adopt a single directory number for multiple telephony devices. Unfortunately, these services are not widely available, and have proven difficult to implement across different communication technologies and different service providers. Further, the one number approach often forces a user to adopt a new directory number, which is typically undesirable once the original directory numbers have become widely known and used by other parties.

Accordingly, there is a need for a way to allow a user to efficiently and effectively control how incoming calls are routed between multiple telephony devices associated with the user, regardless of the telephony device for which the incoming calls were originally intended.

SUMMARY OF THE INVENTION

The present invention provides a service node capable of coordinating call processing for incoming calls intended for any one of multiple telephony devices of a given entity, such as a business or individual user. Switching devices, such as traditional telephony switches or internetworked gateways controlling call routing, are configured to interact with the service node to determine how to handle incoming calls to the telephony devices that they serve. Through a variety of techniques, the entity can dynamically instruct the service node how to route incoming calls, and preferably, upon putting those instructions into effect, the service node will send an alert to the entity. The instructions are used by the service node to create call processing rules for the switching devices to apply to an incoming call intended for any of the entity's telephony devices to effectively route the calls to the intended telephony device or other ones of the entity's telephony devices, route the call to a desired voicemail system, provide call screening or blocking, and any other desired call control activity dictated by the entity's instructions. Based on the call processing rules selected by the given entity, the service node will instruct the switching devices how to route the incoming calls to any of the telephony devices associated with the entity.

Preferably, the entity provides instructions to the service node directly, indirectly through an interactive voice response system, or via a personal computing device. Direct instructions via the telephony devices may include simply toggling a wireline device off hook and then back on hook, dialing any number or set of numbers followed by a send instruction on a wireless device, or simply selecting an icon from a telephony control application on the personal computing device, which will send the instructions to the service node via the Internet or like packet-switched network. Packet-switched telephony applications may operate in either of these fashions. For wireline and wireless applications, the associated telephony switches will recognize these signals and be provisioned to send appropriate messages to the service node. The service node will identify the user from the message sent from the switching devices, place select call processing rules in effect based on the instructions, and send a message back to the switching device to trigger a proper alert to the entity.

The alerting methods may take numerous forms. For example, alerting in a wireline application may include providing a special ring signal, lighting a lamp, or providing a stutter dial tone on the wireline telephony device. For a wireless application, the alert may include a special ring signal, or reception of an instant message via a short messaging service, email, or instant messaging service. An alert to the personal computing device may simply be a pop-up acknowledgement message. Typically, the alerts are sent to the devices from which the instructions were initiated, but certain embodiments provide for alerts to one or more of the other telephony devices or personal computing devices regardless of the device from which the instructions were initiated. The entity may be able to access the service node in any number of ways to establish a profile defining the call processing rules to implement based on the instructions provided by the entity.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a user associated with multiple telephony devices having unique directory numbers or addresses to dynamically select rules for controlling the routing of these calls to one of the telephony devices associated with the user, or to a common voicemail system. Regardless of the telephony device being called, the incoming call may be routed, blocked, screened, or otherwise handled according to a defined set of rules automatically based on instructions received by the called party. In particular, the called party will effectively signal a service node from one of the telephony devices or a properly configured personal computing device to provide instructions to the service node for selecting a call processing rule. Based on the call processing rule, all incoming calls to the associated telephony devices will be controlled accordingly. Preferably, the service node will provide an alert to the called party indicative of the instructions being successfully received and the desired rule set implemented.

As an example, a user (called party) may signal the service node from a first telephony device associated with the user, and the signal triggers the service node to direct all incoming calls intended for any of the user's telephony devices to the first telephony device. A call originated by a caller to a second telephony device associated with the user may be automatically rerouted to the first telephony device associated with the user. As described below and as will be recognized by those skilled in the art, the present invention provides tremendous flexibility in allowing the called party to control routing of incoming calls for all of the called party's telephony devices, even those associated with different networks and network technologies. Further detail regarding the operation of the present invention and select examples are provided after an overview of the communication environment capable of implementing the concepts of the present invention.

Figure 1:
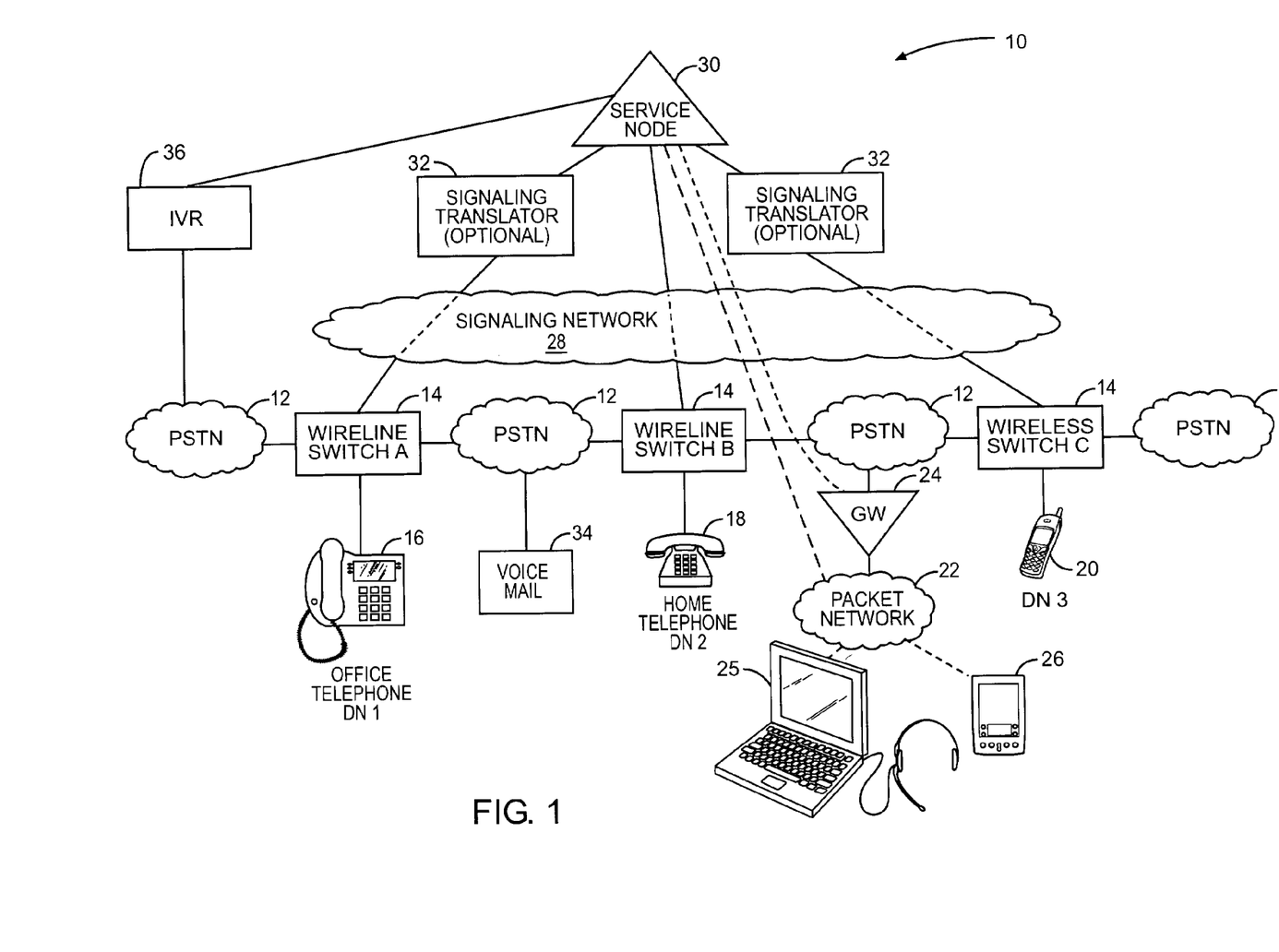
FIG. 1 provides an exemplary communication environment according to one embodiment of the present invention.

With reference to FIG. 1, a communication environment 10 is illustrated as being centered about the public switched telephone network (PSTN) 12, which is operatively coupled to other networks supporting wireless and packet-based communications. Traditionally, telephony switches, such as wireline switches 14 (A and B) are associated with the PSTN 12 and serve respective telephony devices, such as the office telephone 16, which is serviced by wireline switch 14A, and a home telephone 18, which is serviced by wireline switch 14B. The office telephone 16 and the home telephone 18 have respective directory numbers (DNs) DN 1 and DN 2. Calls intended for either of these telephony devices are generally routed via the respective wireline switches 14A and 14B.

For wireless communications, a wireless switch 14 (C), such as a mobile switching center (MSC), will support communications with a mobile terminal 20, such as a wireless telephone or wireless personal digital assistant (PDA). Assume that the mobile terminal 20 is associated with a directory number, DN 3, and all calls routed to the mobile terminal 20 will be routed through the appropriate wireless switch 14C.

For packet-based telephony, such as voice over packet (VoP), interaction between a packet network 22 and the PSTN 12 is facilitated through a gateway 24, which will effectively convert between circuit-switched and packet-switched voice information. Packet telephony may be facilitated via any number of devices, including a personal computer (PC) 25, PDA 26, and packet-based telephones, not shown. Notably, the personal computer 25, as well as the PDA 26, may be linked to the service node 30 via the Internet or like packet-switched network in traditional fashion. Further, access to the service node 30 may be provided by using a browser to interact with a web-based server implemented by the service node 30. Alternatively, proprietary communication software and applications may be used to facilitate the interaction between these devices and the service node 30 to provide instructions for selecting call processing rules in a dynamic fashion.

Call processing, including call routing and control, is preferably provided via a signaling network 28, such as the Signaling System 7 (SS7), which will directly or indirectly interact with the wireline switches 14A and 14B, wireless switch 14C, and perhaps the gateway 24 to facilitate the establishment of telephony calls between various telephony devices. For implementation of the present invention, a call control entity referred to generally as a service node 30 will directly or indirectly through the signaling network 28 communicate with the wireline switches 14A and 14B, wireless switch 14C, and the gateway 24, to process incoming calls directed to any of the user's telephony devices that are illustrated in FIG. 1. Alternatively, call processing signaling may be provided via a packet-based protocol such as SIP (Session Initiation Protocol, IETF standard RFC 3261) between the service node 30 and packet-based devices such as the gateway 24 or PC 25. Depending on the capabilities of the various telephony switches 14, the gateway 24, and the signaling network 28, optional signaling translators 32 may be provided to facilitate an interface between the service node 30 and the various telephony switches 14 and gateway 24. The signaling translators 32 may provide protocol and signaling translations as necessary to enable the service node 30 and the various telephony switches 14 and gateway 24 to communicate. Further, an interactive voice response system (IVR) 36 may be provided to allow users to audibly, or via tones, configure or otherwise instruct the service node 30.

In such a communication environment, the present invention provides a simple and effective way for a user to signal the service node 30 in a way that implements a desired call processing rule, and as such, have incoming calls initially intended for any one of the user's telephony devices directed to a defined telephony device, regardless of whether the telephony device is a wireline, wireless, or packet-based telephony device. In addition to simply vectoring calls to a desired telephony device, the call processing rules may also be more sophisticated, wherein calls may be directed to a common voicemail system 34, or calls may be screened, blocked, or undergo like call handling functions. Preferably, signaling of the service node 30 is effected by user interaction with the telephony device or via the PC 25, PDA 26, or like interaction. For interactions with the telephony devices, the associated telephony switches 14 or gateways 24 will sense a particular user interaction or receive a signal from a user's telephony device, which will trigger sending a message to the service node 30 identifying the telephony device or user, along with the manner or type of interaction the user had with the telephony device. The interaction will define what call processing rules the service node 30 will apply for incoming calls directed to one of the user's associated telephony devices. Those skilled in the art will recognize numerous types of interactions and signals provided by the user via their telephony devices, and the following are merely exemplary to help illustrate the concepts of the present invention.

For wireline-based telephony device, such as the office telephone 16 and the home telephone 18, the corresponding wireline switches 14 (A and B) may recognize an off hook followed by an on hook signal from the office telephone 16 or home telephone 18 as a signal to send a message to the service node 30 indicative of that activity. The service node 30 will recognize that activity as the user selecting the particular device from which the off hook and on hook signals are received, and have all incoming calls directed to that particular telephony device. In a more sophisticated embodiment, the signal may simply select one of many call processing rules defined by the user. A confirmation of the implementation of the rule may be initiated by the service node 30 instructing the corresponding wireline switch 14 (A or B) to provide a special ring signal, illuminate a lamp on the telephony device, or provide a special dial tone the next time the telephone is taken off hook to indicate to the user that the call processing rule has been implemented.

The user may provide signals to the service node 30 in a wireless domain by simply entering a number or series of numbers followed by the send command. The wireless switch 14C will send an appropriate message to the service node 30 upon receiving such an action, and the service node 30 will recognize the user based on the identification of the mobile terminal 20 and implement the desired call processing rule, which in its simplest form will have all incoming calls directed to any of the telephony devices of the user directed to the mobile terminal 20. The service node 30 may effect confirmation by instructing the wireless switch 14C to immediately provide a special ring signal, or initiate some type of message to the mobile terminal 20 indicative of implementation of the desired call processing rule. The messaging may also be an instant message, an email, a short message service (SMS) message, or the like. For either the wireline or wireless cases, the user may dial into the interactive voice response system 36, which is capable of interacting with the service node 30 based on voice or touchtone input to establish as well as select call processing rules.

Alternatively, a computing device, such as the PC 25 or PDA 26, may directly interact with the service node 30 through the Internet or like packet-switched network to establish or dynamically select a call processing rule. Preferably, an application running on the computing device will provide icons associated with the different call processing rules or devices to which incoming calls may be directed. Upon selecting or clicking on a desired icon, the application will send instructions to the service node 30 to implement the corresponding call processing rule. Confirmation of implementation of the call processing rule may be provided directly to the selected device or to the user via a pop-up message or like indication. Although it is preferred to confirm implementation of the desired call processing rule, it is not necessary. Further, confirmation may be provided to the other telephony devices as well as to the computing device, in addition to the particular device from which the instruction to select a call processing rules was initiated.

Importantly, the below illustrated example assumes that the office telephone 16, home telephone 18, personal computer 25, and mobile terminal 20 are all devices having different directory numbers or network addresses and are all associated with a given user (or entity). The respective telephony switches 14A, 14B, and 14C and gateway 24 are provisioned to effectively request call processing instructions from the service node 30, and will process the call based on the response received from the service node 30. The service node 30 will decide how to route the incoming call based on predefined call processing rules or rules previously established by the user, and the latest instructions received by the user for selecting a given one of the rules. The service node 30 may reroute the incoming call to another of the user's telephony devices, block the call, or forward the call to a voicemail system 34, which will preferably be the only voicemail system 34 for the user, regardless of the telephony device for which the incoming call was originally intended. The call processing rules selected by the user may also be a function of virtually any criteria, such as time or date, line status, mobile terminal location, computer presence, an electronic calendar, the caller, or the called number, such that calls from different people may be handled in different ways based on any combination of those criteria. Further, the call processing may be based in part on the originally intended directory number dialed by the caller.

Figure 2:
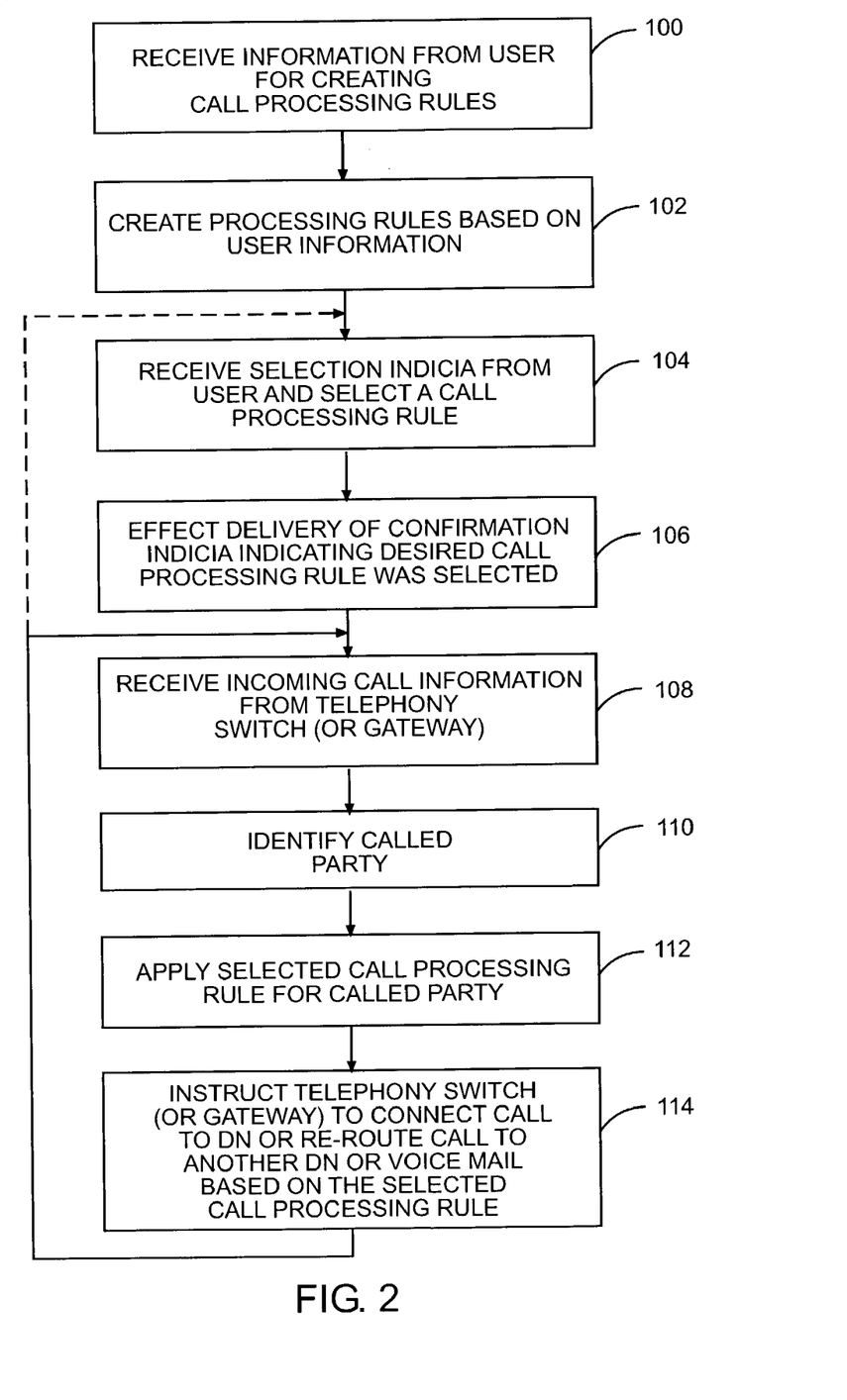
FIG. 2 is a flow diagram providing an operational overview of the present invention according to one embodiment.

With reference to FIG. 2, the basic functionality of a service node 30 is illustrated. Initially, the service node 30 will receive information, preferably from the user, to create the call processing rules (step 100). The call processing rules will essentially be a profile identifying how to process an incoming call based on the chosen variables. From this set of call processing rules, the user can dynamically instruct the service node 30 to select a particular call processing rule via a telephony device, such as the office telephone 16, home telephone 18, or mobile terminal 20, or alternately the personal computer 25 or PDA 26. At this point, call processing is controlled by the default rule until instructions are received from the user via one of the telephony devices, PC 25, or PDA 26 directing the service node 30 to apply a different call processing rule.

To initially configure the service node 30, the user may access the service node 30 via any number of devices, including the PC 25, PDA 26, or telephony devices, directly or indirectly via an interactive voice response system 36 (see FIG. 1). Those skilled in the art will recognize the multitude of ways for allowing a user to interact with the service node 30 to effectively establish the initial call processing rules and the actions to be received from the user, which will select the call processing rules. Interaction with the service node 30 via the computer 25 or PDA 26 is preferably done via a browser interface in traditional fashion. Preferably, the user is able to set up different types of profiles having different call processing rule sets, such that call processing is handled differently given the current state of the user. For example, different call processing rules may be established when the user is in the office, at home, telecommuting, traveling, on vacation, out of the office, or in a meeting. For additional information on establishing profiles and providing call processing rules, see U.S. application Ser. No. 10/382,247, entitled COMMON CALL ROUTING FOR MULTIPLE TELEPHONY DEVICES and filed Mar. 5, 2003, which is incorporated herein by reference in its entirety.

Once the information to create the call processing rules is received (step 100), rules are then created based on the user information and a default rule is put into effect (step 102). Preferably, the telephony switches 14 or gateways 24 are provisioned to interact with the service node 30 to receive call processing instructions upon receiving a call directed to a telephony device associated with the user. When the user wishes to implement a desired call processing rule, an appropriate action on the part of one of the associated telephony devices, PC 25, or PDA 26 is initiated, which will directly or indirectly via a switching device send instructions including rule selection indicia to the service node 30. The service node 30 will receive the selection indicia from the user and select a call processing rule based thereon (step 104). Next, the service node 30 will effect delivery of confirmation indicia indicating the desired call processing rule was selected and will be implemented until changed by the user or according to a previously defined call processing rule or profile (step 106).

Once provisioned, the various telephony switches 14 and gateways 24 will recognize an incoming call intended for the user, and initiate interaction with the service node 30. The service node 30 will receive the incoming call information from the telephony switches 14 or gateways 24 handling the incoming call (step 108). The information received from the telephony switch 14 or gateway 24 is sufficient to identify the called party, and preferably the caller. As such, the service node 30 will initially identify the called party (step 110) and then apply the call processing rules for the called party to determine how the telephony switch 14 or gateway 24 should handle the incoming call (step 112). Next, the service node 30 will instruct the telephony switch 14 or gateway 24 to connect the call to the intended directory number, or to reroute the call to another directory number or to voicemail, based on the selected call processing rule (step 114). The telephony switch 14 or gateway 24 will then process the incoming call accordingly. Notably, the use of directory number (DN) is intended to encompass any type of telephony addressing, including Internet Protocol (IP) addresses or the like, used for routing packet-based voice communications. If and as calls are forwarded to telephony switches 14 servicing the various telephony devices under the instruction of the service node 30, each of the telephony switches 14 or gateways 24 will interact with the service node 30 as necessary to handle and direct the call according to the selected call processing rule.

Figure 3A:
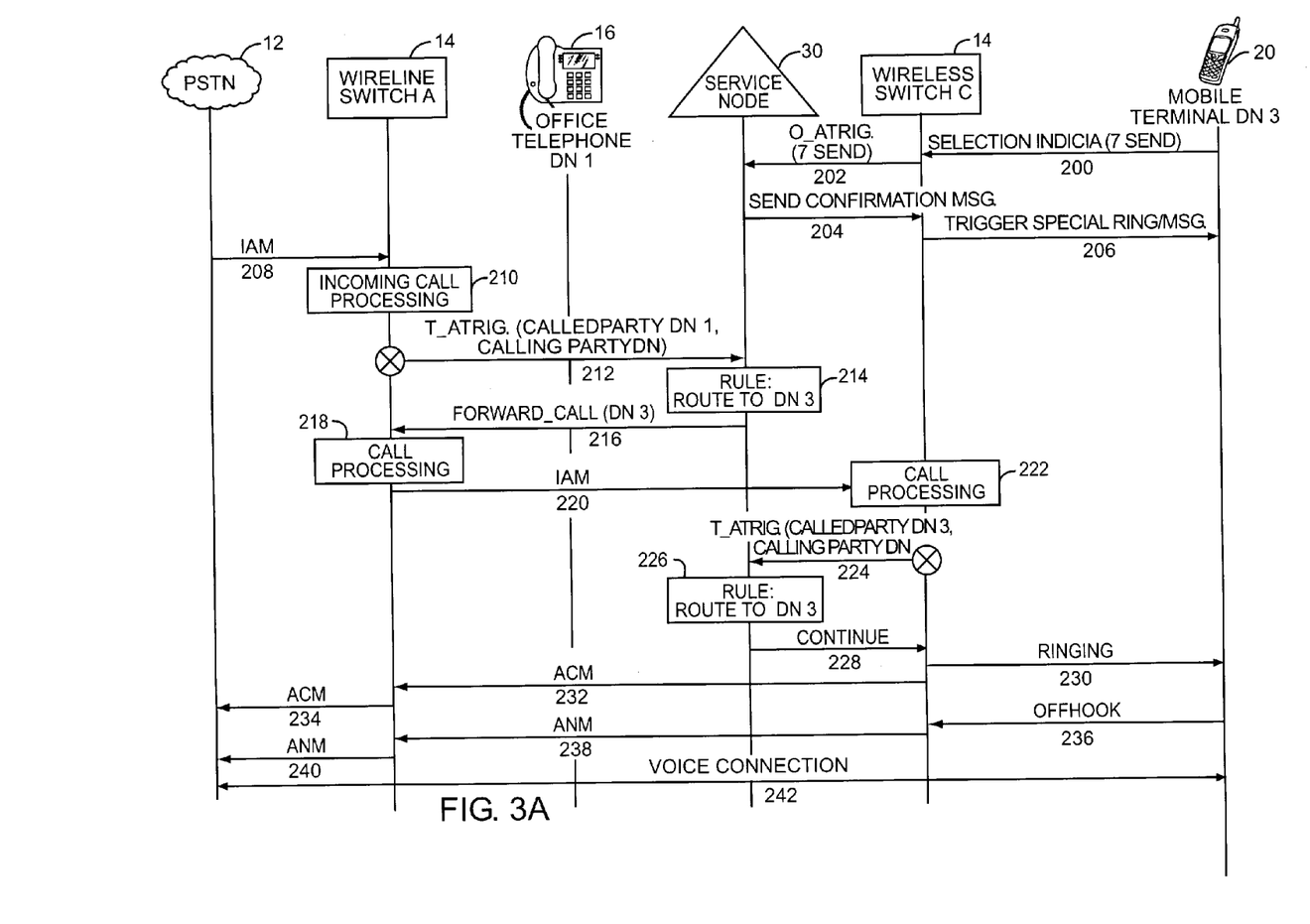
FIGS. 3A and 3B are an exemplary call flow diagram for a first scenario according to one embodiment of the present invention.

An exemplary call flow is provided in FIG. 3A, wherein an incoming call is originally intended for the user's office telephone 16, wherein the user dynamically selects a call processing rule, which will at the service node 30 forward incoming calls directed to the office telephone 16, home telephone 18, or mobile terminal 20 to the mobile terminal 20, which is associated with directory number DN 3. As illustrated in FIG. 1, the office telephone 16 is serviced by wireline switch A (14), the home telephone 18 is serviced by wireline switch B (14), and the mobile terminal 20 is serviced by wireless switch C (14).

Initially, the user will decide to have all incoming calls to the office telephone 16, home telephone 18, or mobile terminal 20 routed to the mobile terminal 20, and as such will effectively initiate delivery of selection indicia from the mobile terminal 20 to the service node 30 by entering a defined number and hitting send. In this case, assume that entering the number 7 and hitting send will trigger the wireless switch 14C to send a message to the service node 30, triggering the service node 30 to implement a call processing rule to direct all incoming calls directed to any of the telephony devices to the mobile terminal 20. Accordingly, when the user enters 7 and hits send, the selection indicia is sent from the mobile terminal 20 to wireless switch C (step 200), which is provisioned to send an origination attempt trigger (O_A TRIG.) identifying the mobile terminal 20 and the selection indicia to the service node 30 (step 202). The service node 30 will identify the user based on the identity of the mobile terminal 20, preferably via the mobile terminal's caller ID or other identification indicia, access the call processing rules or profiles for the user, and select the appropriate call processing rule based on the selection indicia. Next, the service node 30 will send a confirmation message to wireless switch C (step 204), which will trigger a special ring at the mobile terminal 20 or send a message to the mobile terminal 20 indicating that the instructions have been implemented by the service node 30 and all calls will be forwarded to the mobile terminal 20 (step 206).

For an incoming call to any of the telephony devices, and in this example, to the office telephone 16 using DN 1, indication of the incoming call to the office telephone 16 is provided in an Initial Address Message (IAM) sent to wireline switch A from a telephony switch in the PSTN 12 (step 208). Wireline switch A will recognize that the incoming call is intended for the office telephone 16 based on the office telephone's directory number DN 1 included in the IAM during incoming call processing (step 210), and recognize that calls intended for the office telephone 16 should trigger the initiation of a termination attempt trigger message to the service node 30. Accordingly, a termination attempt trigger message (T_A TRIG.) is sent to the service node 30 and will identify the directory number for the called party, DN 1, and that of the caller, DN (step 212). The service node 30 will directly or indirectly receive the termination attempt trigger, identify the selected call processing rule based on the notification of the called party (DN 1), and determine how wireline switch A should process the incoming call (step 214). In this case, the rule applied indicates wireline switch A should route the incoming call to directory number DN 3, which is associated with the user's (called party's) mobile terminal 20. As such, the service node 30 will send instructions to wireline switch A to forward the call to directory number DN 3 (step 216). Wireline switch A will provide the requisite call processing (step 218) and send an IAM directly or indirectly to wireless switch C, which services the mobile terminal 20 (step 220).

Wireless switch C will provide the requisite call processing (step 222), and recognize that incoming calls directed to the mobile terminal 20 require instructions from the service node 30. As such, a termination attempt trigger is sent to the service node 30 identifying the caller by directory number DN, and called party by the directory number for the mobile terminal 20, DN 3 (step 224). The service node 30 will identify the call processing rule based on directory number DN 3, recognize that the call should be routed to the mobile terminal 20 (step 226) and send a continue message to wireless switch C (step 228). Wireless switch C will cause the mobile terminal 20 to ring (step 230), as well as send an Address Complete Message (ACM) to wireline switch A indicating that the home telephone 18 is ringing (step 232). Wireline switch A will forward the ACM as necessary to the PSTN 12 and ultimately the originating switch (step 234). When the mobile terminal 20 is answered, wireless switch C will recognize that the mobile terminal 20 has gone offhook (step 236), which will trigger the sending of an Answer Message (ANM) to wireline switch A (step 238), which will forward the ANM to the PSTN 12 in traditional fashion (step 240). At this point, a voice connection is established between the mobile terminal 20 and the telephony device of the caller (step 242).

Figure 3B:
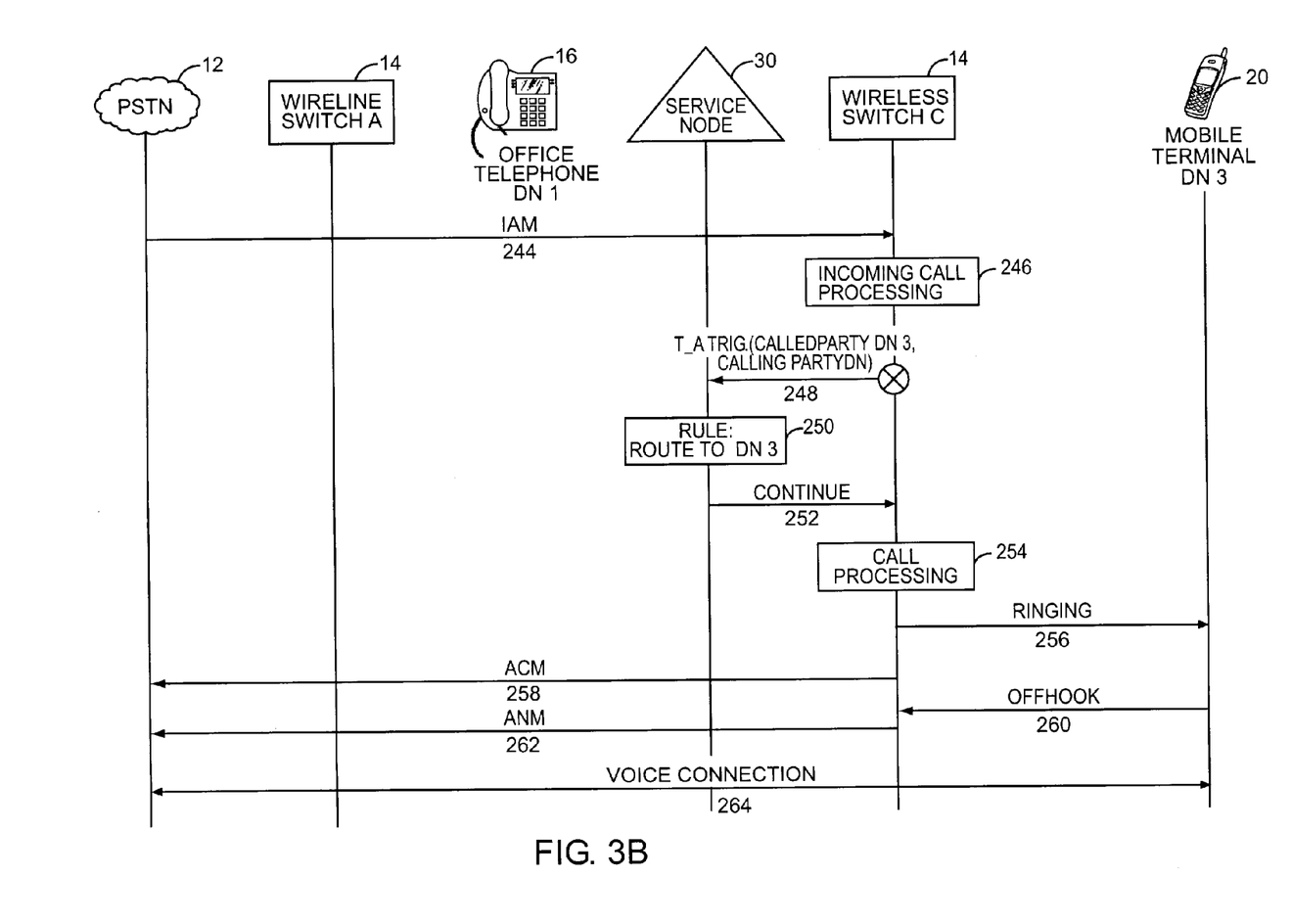

Turning now to FIG. 3B, assume the incoming call from the caller is made directly to the mobile terminal 20 using directory number DN 3. As such, the IAM is sent directly to wireless switch C (step 244), which will provide the initial incoming call processing (step 246). Upon recognizing that the call is intended for directory number DN 3 and requires support from the service node 30, a termination attempt trigger is sent to the service node 30 identifying the directory numbers for the called party (user) and caller (step 248). The service node 30 will identify the call processing rules to use based on the called party's directory number DN 3 and decide how wireless switch C should process the incoming call (step 250). Since calls to the user are supposed to be routed to the mobile terminal 20 associated with directory number DN 3 in this scenario, the service node 30 will cause wireless switch C to proceed in a normal fashion and route the call to the mobile terminal 20 by sending a continue message to wireless switch C (step 252). Wireless switch C will proceed with call processing (step 254) and begin ringing the mobile terminal 20 (step 256). Concurrently, wireless switch C will send an ACM back to the PSTN 12 (step 258) and await answering of the mobile terminal 20. Upon being answered, wireless switch C will recognize that the mobile terminal 20 has gone offhook (step 260) and send an ANM to the PSTN 12 (step 262) in traditional fashion. At this point, a voice connection is established between the mobile terminal 20 and the telephony device of the caller (step 264).

As seen from the above, allowing the telephony switches 14 or gateways 24 servicing various telephony devices of a given user to be coordinated for incoming calls to the user allows the user to effectively and efficiently control how calls are processed among any of the telephony devices, or the voicemail system 34. The invention is particularly beneficial in allowing a user to effectively use her mobile terminal 20 in conjunction with her wireline work or home telephones 16, 18. By dynamically configuring the service node 30 to handle or otherwise process incoming calls to any of the telephony devices to a desired telephony device or a single voicemail system 34, all incoming calls, regardless of the originally intended telephony device, are efficiently controlled by the user. If a common voicemail system 34 is defined, the user avoids having voicemails left in different voicemail systems or answering machines, while making communications with her much more efficient for those initiating the calls. By controlling call processing via the service node 30 for multiple telephony devices having unique directory numbers, the user does not have to use multiple call forwarding systems in a rudimentary manner to control call handling. Further, current call forwarding systems will not allow the associated telephony device to receive a call, and thus, call screening is not available.

A common scenario to most mobile terminal users is one where the user is in a meeting or participating in a conference call on an office telephone 16. The service node 30 may have a profile for the user specifically adapted for meeting situations. Further, in these situations, most incoming calls should be diverted to voicemail, but there are certain people, such as the user's boss, that should be able to contact the user at any given time, even when in meetings. As such, the meeting profile in the service node 30 may be configured to divert incoming calls directed to the office telephone 16 or the mobile terminal 20 to a common voicemail system 34 from all calling parties, except the user's boss, whose various directory numbers are provided to the service node 30. Thus, upon recognizing incoming calls to the office telephone 16 or mobile terminal 20 for the user, the service node 30 will direct the respective telephony switches 14 to forward the call to voicemail, unless the call is from the boss, in which case the call will be directed to the mobile terminal 20.

The user may also have a general office profile that directs calls that are made to the mobile terminal 20, office telephone 16, or other associated telephony device to the office telephone 16. To further refine this profile, the user may decide to block calls from certain callers and have those calls automatically forwarded to the voicemail system 34. As those skilled in the art will recognize, various profiles based on user configuration, time and date, incoming or outgoing call identification, and the like, may be used to provide unlimited call processing rule sets, which may be dynamically selected by the user through her telephony devices, PC, PDA, or even via the IVR 36. Each user may have any number of rule sets, and the service node 30 may support any number of telephony devices for a given user. Although a significant portion of the above disclosure is directed to wireline and wireless telephony communications, those skilled in the art will also recognize the ease with which call processing entities for packet-switched systems can interact with the service node 30 to facilitate the unified call processing of the present invention, and may support numerous users and their associated telephony devices. Notably, the term "user" used herein relates to any type of entity or individual, and the various telephony devices may be associated with multiple directory numbers.

Figure 4:
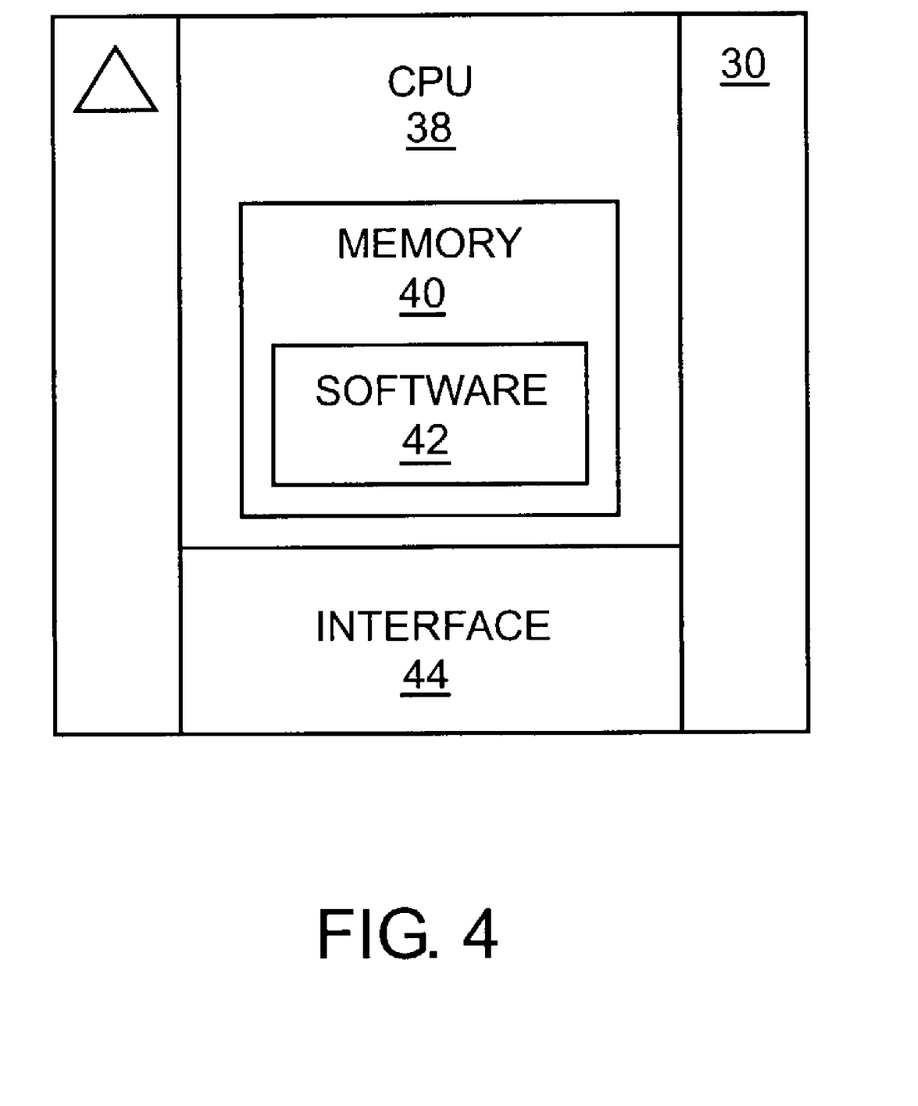
FIG. 4 is a block representation of a service node constructed according to one embodiment of the present invention.

The service node 30 may take on many forms and be integrated with other call processing systems, as well as having numerous interfaces for effectively communicating directly or indirectly with the various telephony switches 14, gateways 24, or other packet-based call processing entities. As illustrated in FIG. 4, the service node 30 will typically be associated with a central processing unit (CPU) 38 having sufficient memory 40 for storing the necessary software 42 for implementing the concepts of the present invention. The CPU 38 will have a communication interface 44 for communicating directly or indirectly with the various telephony switches 14, gateways 24, or like call processing entities.

Those skilled in the art will recognize improvements and modifications to the preferred embodiments of the present invention. All such improvements and modifications are considered within the scope of the concepts disclosed herein and the claims that follow.

What is claimed is:

1. A method for allowing a user to control call processing comprising:
   receiving selection indicia resulting from an action taken by the user at a user device;
   implementing a call processing rule based on the selection indicia, the call processing rule defining how to process incoming calls directed to a plurality of telephony devices associated with the user, wherein each of the plurality of telephony devices is associated with a unique address or telephony number;
   sending instructions to process an incoming call intended for one of the plurality of telephony devices, the incoming call bearing a destination address of the unique address or telephony number and the instructions to process the incoming call are based on the call processing rule; and
   sending confirmation indicia intended to effect delivery of an alert to the user indicative of the call processing rule being implemented.

2. The method of claim 1 wherein the user device is a wireline telephony device, which is one of the plurality of telephony devices, and the selection indicia is received from a wireline telephony switch, which sends the selection indicia in response to an action taken by the wireline telephony device.

3. The method of claim 2 wherein sending confirmation indicia comprises sending the confirmation indicia to the wireline telephony switch, which is configured to provide the alert to the user via the wireline telephony device.

4. The method of claim 2 wherein the instructions are sent to the wireline telephony switch.

5. The method of claim 2 wherein the action taken by the wireline telephony device is toggling the wireline telephony device off and on book.

6. The method of claim 1 wherein the user device is a wireless telephony device, which is one of the plurality of telephony devices, and the selection indicia is received from a wireless telephony switch, which sends the selection indicia in response to an action taken by the wireless telephony device.

7. The method of claim 6 wherein sending confirmation indicia comprises sending the confirmation indicia to the wireless telephony switch, which is configured to provide the alert to the user via the wireless telephony device.

8. The method of claim 6 wherein the instructions are sent to the wireless telephony switch.

9. The method of claim 6 wherein the action taken by the wireless telephony device is entering and sending a defined number.

10. The method of claim 1 wherein the user device is a packet-based telephony device, which is one of the plurality of telephony devices, and the selection indicia is received from a packet-based gateway, which sends the selection indicia in response to an action taken by the packet-based telephony device.

11. The method of claim 10 wherein sending confirmation indicia comprises sending the confirmation indicia to the packet-based gateway, which is configured to provide the alert to the user via the packet-based telephony device.

12. The method of claim 10 wherein the instructions are sent to the packet-based gateway.

13. The method of claim 1 wherein the user device is a personal computing device and the selection indicia is received from the personal computing device.

14. The method of claim 1 further comprising receiving the selection indicia resulting from actions taken by the user at a plurality of user devices serviced by different telephony switches and sending the instructions to process the incoming calls intended for the plurality of telephony devices based on the call processing rule.

15. The method of claim 11 wherein one of the different telephony switches is a wireless telephony switch and another one of the different telephony switches is a wireline telephony switch.

16. The method of claim 1 wherein the call processing rule effects routing of all incoming calls intended for any of the plurality of telephony devices to the user device, which is one of the plurality of telephony devices associated with the user.

17. The method of claim 1 wherein the call processing rule effects routing of all incoming calls intended for any of the plurality of telephony devices to another user device, which is one of the plurality of telephony devices associated with the user.

18. The method of claim 1 wherein the call processing rule effects routing of all incoming calls intended for any of the plurality of telephony devices, which is one of the plurality of telephony devices associated with the user, to a voicemail system associated with the user.

19. The method of claim 1 wherein the alert is a message sent to the user device.

20. The method of claim 1 wherein the alert is a special dial tone provided when the user uses the user device.

21. The method of claim 1 wherein the alert is lighting a light on the user device.

22. The method of claim 1 wherein the alert is a message provided to the user via a personal computing device of the user.

23. A system for allowing a user to control call processing comprising:
a) an interface; and
b) a central processing unit associated with the interface and adapted to:
receive selection indicia resulting from an action taken by the user at a user device;
implement a call processing rule based on the selection indicia, the call processing rule defining how to process incoming calls directed to a plurality of telephony devices associated with the user, wherein each of the plurality of telephony devices is associated with a unique address or telephony number;
send instructions to process an incoming call intended for one of the plurality of telephony devices, the incoming call bearing a destination address of the unique address or telephony number and the instructions to process the incoming call are based on the call processing rule; and
send confirmation indicia intended to effect delivery of an alert to the user indicative of the call processing rule being implemented.

24. The system of claim 23 wherein the user device is a wireline telephony device, which is one of the plurality of telephony devices, and the selection indicia is received from a wireline telephony switch, which sends the selection indicia in response to an action taken by the wireline telephony device.

25. The system of claim 24 wherein the central processing unit is further adapted to send the confirmation indicia to the wireline telephony switch, which is configured to provide the alert to the user via the wireline telephony device.

26. The system of claim 24 wherein the instructions are sent to the wireline telephony switch.

27. The system of claim 24 wherein the action taken by the wireline telephony device is toggling the wireline telephony device off and on hook.

28. The system of claim 23 wherein the user device is a wireless telephony device, which is one of the plurality of telephony devices, and the selection indicia is received from a wireless telephony switch, which sends the selection indicia in response to an action taken by the wireless telephony device.

29. The system of claim 28 wherein the central processing unit is further adapted to send the confirmation indicia to the wireless telephony switch, which is configured to provide the alert to the user via the wireless telephony device.

30. The system of claim 28 wherein the instructions are sent to the wireless telephony switch.

31. The system of claim 28 wherein the action taken by the wireless telephony device is entering and sending a defined number.

32. The system of claim 23 wherein the user device is a packet-based telephony device, which is one of the plurality of telephony devices, and the selection indicia is received from a packet-based gateway, which sends the selection indicia in response to an action taken by the packet-based telephony device.

33. The system of claim 32 wherein the central processing unit is further adapted to send the confirmation indicia to the packet-based gateway, which is configured to provide the alert to the user via the packet-based telephony device.

34. The system of claim 32 wherein the instructions are sent to the packet-based gateway.

35. The system of claim 23 wherein the user device is a personal computing device and the selection indicia is received from the personal computing device.

36. The system of claim 23 wherein the central processing unit is further adapted to receive selection indicia resulting from actions taken by the user at a plurality of user devices serviced by different telephony switches and sending instructions to process incoming calls intended for the plurality of telephony devices based on the call processing rule.

37. The system of claim 36 wherein one of the different telephony switches is a wireless telephony switch and another one of the different telephony switches is a wireline telephony switch.

38. The system of claim 23 wherein the call processing rule effects routing of all incoming calls intended for any of the plurality of telephony devices to the user device, which is one of The plurality of telephony devices associated with the user.

39. The system of claim 23 wherein the call processing rule effects routing of all incoming calls intended for any of the plurality of telephony devices to another user device, which is one of the plurality of telephony devices associated with the user.

40. The system of claim 23 wherein the call processing rule effects routing of all incoming calls intended for any of the plurality of telephony devices, which is one of the plurality of telephony devices associated with the user, to a voicemail system associated with the user.

41. The system of claim 23 wherein the alert is a message sent to the user device.

42. The system of claim 23 wherein the alert is a special dial tone provided when the user uses the user device.

43. The system of claim 23 wherein the alert is lighting a light on the user device.

44. The system of claim 23 wherein the alert is a message provided to the user via a personal computing device of the user.

* * * * *